United States Patent
Kondo (10) Patent No.: US 11,816,526 B2
(45) Date of Patent: Nov. 14, 2023

(54) FUNCTION EXECUTION SYSTEM

(71) Applicant: SUNCORPORATION, Konan Aichi (JP)

(72) Inventor: Makoto Kondo, Konan (JP)

(73) Assignee: SUNCORPORATION, Konan (JP)

(*) Notice: Subject to any disclaimer, the term of this patent is extended or adjusted under 35 U.S.C. 154(b) by 202 days.

(21) Appl. No.: 17/596,975

(22) PCT Filed: Jun. 24, 2019

(86) PCT No.: PCT/JP2019/024939
§ 371 (c)(1),
(2) Date: Dec. 22, 2021

(87) PCT Pub. No.: WO2020/261329
PCT Pub. Date: Dec. 30, 2020

(65) Prior Publication Data
US 2022/0318533 A1  Oct. 6, 2022

(51) Int. Cl.
*G06K 7/10* (2006.01)
*G05B 23/02* (2006.01)
(Continued)

(52) U.S. Cl.
CPC ..... *G06K 7/10722* (2013.01); *G05B 23/0264* (2013.01); *G06F 3/011* (2013.01); *G06K 7/10881* (2013.01); *G06K 7/14* (2013.01)

(58) Field of Classification Search
CPC .. G06K 7/10722; G06K 7/10881; G06K 7/14; G05B 23/0264; G05B 19/042; G06F 3/011; G06Q 10/20
See application file for complete search history.

(56) References Cited

U.S. PATENT DOCUMENTS 9,665,170 B1 * 5/2017 Ross .................. G06F 3/011
2007/0103287 A1   5/2007 Horitgami et al.
(Continued)

FOREIGN PATENT DOCUMENTS

JP   2008022130 A   1/2008
JP      4774929 B2   9/2011
(Continued)

OTHER PUBLICATIONS

Written Opinion of the International Searching Authority for International PCT Application PCT/JP2019/024939, dated Sep. 17, 2019 (English Translation).
(Continued)

*Primary Examiner* — Jamara A Franklin
(74) *Attorney, Agent, or Firm* — K&L Gates LLP (57) ABSTRACT

A function execution system includes a function execution device configured to execute a plurality of functions, a storage device, an image acquisition device, and a reader device. The function execution device switches between first to fourth functions to be executed depending on whether code information, which is read by the reader device based on an image representing an information code included in a captured image acquired by the image acquisition device from the image capturing unit, is first code information or second code information and whether user information stored in the storage device is first user information or second user information.

7 Claims, 6 Drawing Sheets

(51) Int. Cl.
*G06F 3/01* (2006.01)
*G06K 7/14* (2006.01)

(56) References Cited

U.S. PATENT DOCUMENTS

| | | | |
|---|---|---|---|
| 2012/0051651 A1* | 3/2012 | Yamaoka | G06V 40/10 382/195 |
| 2013/0120449 A1 | 5/2013 | Ihara et al. | |
| 2014/0253866 A1* | 9/2014 | Carabajal | G02B 27/017 351/123 |
| 2015/0168727 A1* | 6/2015 | Qaddoura | G06F 1/163 345/156 |
| 2017/0061212 A1 | 3/2017 | Tanaka et al. | |
| 2018/0074771 A1 | 3/2018 | Cronin | |
| 2018/0367628 A1 | 12/2018 | Yamashita et al. | |

FOREIGN PATENT DOCUMENTS

| | | |
|---|---|---|
| JP | 2011248860 A | 12/2011 |
| JP | 6074376 B2 | 2/2017 |
| JP | 2017049762 A | 3/2017 |
| JP | 2017167992 A | 9/2017 |
| JP | 2018109855 A | 7/2018 |
| JP | 2018156478 A | 10/2018 |
| JP | 2019003532 A | 1/2019 |
| JP | 2019067414 A | 4/2019 |

OTHER PUBLICATIONS

Japanese Office Action dated Mar. 7, 2023 for Japanese Patent No. 2021-528657; English Translation.
International Search Report and Written Opinion for International PCT Application PCT/JP2019/024939, dated Sep. 17, 2019.

* cited by examiner

FUNCTION EXECUTION SYSTEM

CROSS-REFERENCE TO RELATED APPLICATION

This application is a U.S. National Stage Entry under 35 U.S.C. § 371 of International Application No. PCT/JP2019/024939, entitled FUNCTION EXECUTION SYSTEM and filed Jun. 24, 2019, the disclosure of which is incorporated herein by reference in its entirety and for all purposes.

TECHNICAL FIELD

The technique disclosed in the present specification relates to a function execution system.

BACKGROUND ART

For example, Japanese Patent No. 6074376 (hereinafter referred to as Patent Document 1) describes a remote monitoring system that monitors abnormalities of devices installed at multiple places in a building. This remote monitoring system includes a plurality of monitoring devices that detect abnormalities of the devices and report the detection of abnormalities, a plurality of monitoring centers including a plurality of monitoring desks, and a receiving server that receives reports from the respective monitoring devices and sends the reports to one of the monitoring centers. Here, the receiving server determines which monitoring center is in operation among the plurality of monitoring centers and sends the received reports to the monitoring center in operation.

SUMMARY

Technical Problem

As the technique of Patent Document 1 above, devices installed in a site, such as a building, are appropriately used and managed by a terminal device used by a user visiting the site (e.g., a device user, a maintenance staff of the devices, etc.) appropriately executing various functions including a function of executing communication between the devices and their installer, a function of displaying information related to the devices such as their manuals, etc.

Meanwhile, a site to be managed may include devices installed by different installers. In this case, the user of the terminal device has to perform on the terminal device, for each one of the devices in the site, a necessary operation to execute each function including a function of executing communication between the device and its installer, a function of displaying information related to the device such as its manual, etc. Further, the necessary operations to execute the functions may differ from installer to installer, which imposes a great operation-related burden on the user of the terminal device.

The present specification discloses a technique that enables a reduction in an operation-related burden on a user of a terminal device.

Solution to Technical Problem

A function execution system disclosed in the present specification comprises: a function execution device configured to execute a plurality of functions including a first function, a second function different from the first function, a third function, and a fourth function different from the third function; a storage device configured to store one of first user information that indicates a user of the function execution device is a first-type user and second user information that indicates the user of the function execution device is a second-type user different from the first-type user; an image acquisition device configured to acquire a captured image from an image capturing unit; and a reader device configured to, in a case where the captured image acquired by the image acquisition device includes an image representing an information code, read information recorded in the information code. The function execution device is configured to: execute the first function in a first case where the reader device reads first code information related to the first and second functions from the information code and the storage device stores the first user information; execute the second function in a second case where the reader device reads the first code information from the information code and the storage device stores the second user information; execute the third function in a third case where the reader device reads second code information related to the third and fourth functions from the information code and the storage device stores the first user information; and execute the fourth function in a fourth case where the reader device reads the second code information from the information code and the storage device stores the second user information.

For example, a single site may include a plurality of devices (i.e., management targets). In such a case, the devices may be appropriately used or maintained by the function execution device executing, for each of the devices, the plurality of functions related to handling of the device, such as a function of executing communication with the installer of the device in order to handle the device, a function of displaying information related to the device such as the manual of the device, etc. With conventional configurations, the user of the function execution device (e.g., a device user, a maintenance staff, etc.) has to perform, for each device in the site, a necessary operation on the function execution device to execute each function related to handling of the device. Meanwhile, depending on the attribute of the user of the function execution device (e.g., user type such as the device user, the maintenance staff, etc.), a terminal device may be desired to execute different functions to use or maintain the devices.

According to the above configuration, the function execution device may switch between the first to fourth functions to be executed depending on whether the code information, which is read by the reader device from the image representing the information code included in the captured image that the image acquisition unit acquired from the image capturing unit, is the first code information or the second code information and whether the user information stored in the storage device is the first user information or the second user information. Further, according to the above configuration, the function execution device may execute different functions depending on the user information (i.e., user's attribute) stored in the storage device even when specific code information (the first code information or the second code information) is acquired by the reader device reading a specific information code. Thus, when management targets are provided with an information code in which the first code information is recorded and an information code in which the second code information is recorded such that these codes may be captured from the outside, the function execution device may execute an appropriate function among the first to fourth functions in response to the image capturing unit capturing one of these information codes, depending on the attribute of the user of the function execution device (e.g., user type such as the device user, the maintenance staff, etc.) and the code information recorded in the read information codes (e.g., code information different for each device installer). The user of the function execution device does not have to input operations to execute the respective functions separately for each management target. Thus, according to the above configuration, an operation-related burden on the user of the function execution device may be appropriately reduced. It should be noted that "execute (first to fourth) functions" herein may include both actual execution of the functions and a shift to a state in which the functions may be executed (regardless of whether the functions are actually executed or not).

The function execution system may further comprise a terminal component and a management component capable of communicating with the terminal component. The terminal component may include the function execution device, the image acquisition device, the reader device, and the storage device. The terminal component may be configured to cause the function execution device to: execute the first function in response to sending a first request to the management component and then receiving a first function executing instruction from the management component in the first case; execute the second function in response to sending a second request different from the first request to the management component and then receiving a second function executing instruction from the management component in the second case; execute the third function in response to sending a third request to the management component and then receiving a third function executing instruction from the management component in the third case; and execute the fourth function in response to sending a fourth request different from the third request to the management component and then receiving a fourth function executing instruction from the management component in the fourth case. The management component may be configured to: send the first function executing instruction to the terminal component in a case of receiving the first request from the terminal component; send the second function executing instruction to the terminal component in a case of receiving the second request from the terminal component; send the third function executing instruction to the terminal component in a case of receiving the third request from the terminal component; and send the fourth function executing instruction to the terminal component in a case of receiving the fourth request from the terminal component.

According to this configuration, the user may use the terminal component including the function execution device, the image acquisition device, the reader device, and the storage device. In this case as well, the function execution device may execute an appropriate function among the first to fourth functions as a result of the image capturing unit capturing an information code, depending on the attribute of the user of the function execution device (e.g., user type such as the device user, the maintenance staff, etc.) and the code information recorded in the read information code (e.g., code information different for each device installer).

The first function may be a function executed after a first application program has been activated. The second function may be a function executed without the first application program being activated. The third function may be a function executed after a second application program has been activated. The fourth function may be a function executed without the second application program being activated.

According to this configuration, even when the reader device reads a specific information code, the function execution device may appropriately switch between the function (the first function or the third function) accompanied by the activation of the application program (the first application program or the second application program) and the function (the second function or the fourth function) that is not accompanied by the activation of the application program depending on the user information (i.e., the type (attribute) of the user) stored in the storage device, and execute the same.

The first application program may be an application program for executing communication with a first communication counterpart. The second application program may be an application program for executing communication with a second communication counterpart. The first function may be a function including execution of the communication with the first communication counterpart. The second function may be a function including display of first information to be browsed. The third function may be a function including execution of the communication with the second communication counterpart. The fourth function may be a function including display of second information to be browsed.

According to this configuration, even when the reader device reads a specific information code, the function execution device may appropriately switch between the function (the first function or the third function) including execution of communication with the communication counterpart (the first communication counterpart or the second communication counterpart) and the function including display of information to be browsed (the first information to be browsed or the second information to be browsed) depending on the user information (i.e., the type (attribute) of the user) stored in the storage device, and execute it.

The function execution device may execute none of the first function, the second function, the third function, and the fourth function in a case where the reader device reads third code information that is related to none of the first function, the second function, the third function, and the fourth function from the information code.

The image capturing unit may capture an information code in which the third code information, which is related to none of the first to fourth functions, is recorded. According to this configuration, the function execution device executes none of the functions in a case where the reader device reads the third code information, which is related to none of the first to fourth functions, from the information code. This suppresses erroneous execution of the functions.

The function execution device may comprise a frame wearable on ahead of the user, and a display unit arranged on the frame and configured to be positioned within a range of vision of the user when the frame is worn on the head of the user.

According to this configuration, the function execution device may be configured as a head-mounted terminal device (a so-called head-mounted display) wearable on the head of the user. The user does not have to hold the function execution device with the hand(s) and thus may work with both hands. According to the above configuration, convenience for the user is improved as compared to a case where the user has to hold the function execution device.

Control methods, computer programs, and computer-readable storage media storing the computer programs for implementing the function execution device, image acquisition device, reader device, and storage device described above are also novel and useful. Further, control methods, computer programs, and computer-readable storage media storing the computer programs for implementing the terminal component and management component described above are also novel and useful.

Figure 1:
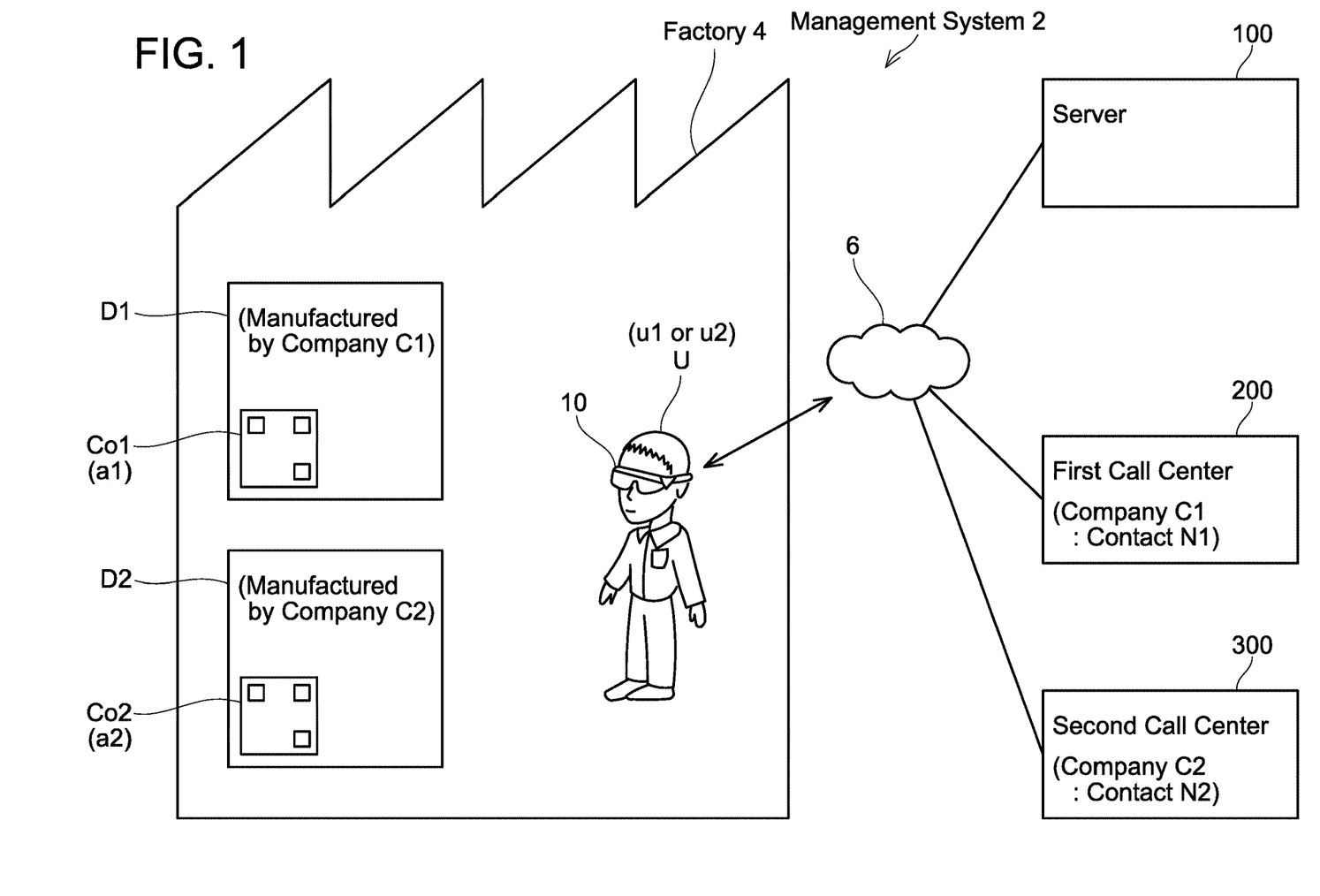
FIG. 1 schematically illustrates a management system 2.

FIRST EMBODIMENT (Configuration of Management System 2; FIG. 1)

A management system 2 according to the present embodiment illustrated in FIG. 1 is a system for using and/or maintaining (i.e., managing) a plurality of devices D1, D2, etc. installed in a factory 4. The devices D1, D2 in the present embodiment, which are management targets, are manufactured and provided by different companies (manufacturers), respectively. The device D1 is manufactured and provided by a company C1, which is a first manufacturer. The device D2 is manufactured and provided by a company C2, which is a second manufacturer. An information code Co1 in which a company ID "a1" representing the company C1 is recorded is attached to a surface of the device D1. Similarly, an information code Co2 in which a company ID "a2" representing the company C2 is recorded is attached to a surface of the device D2. In another example, the two information codes Co1, Co2 may be attached to a surface of one common device.

The management system 2 according to the present embodiment comprises a terminal device 10, a server 100, a first call center 200, and a second call center 300. The terminal device 10 is capable of executing Wi-Fi communication with the server 100, the first call center 200, and the second cell center 300 via the Internet 6. The first cell center 200 and the second call center 300 are established by the company C1 and the company C2, respectively. A contact of the first call center 200 and a contact of the second call center 300 are "N1" and "N2", respectively. The terminal device 10 is worn on the head of a user U who is in the factory 4. In the example of FIG. 1, only one terminal device 10 which is capable of communicating with the server 100 is illustrated, however, in actual implementation, the management system 2 may include a plurality of terminal devices capable of communicating with the server 100.

Figure 2:
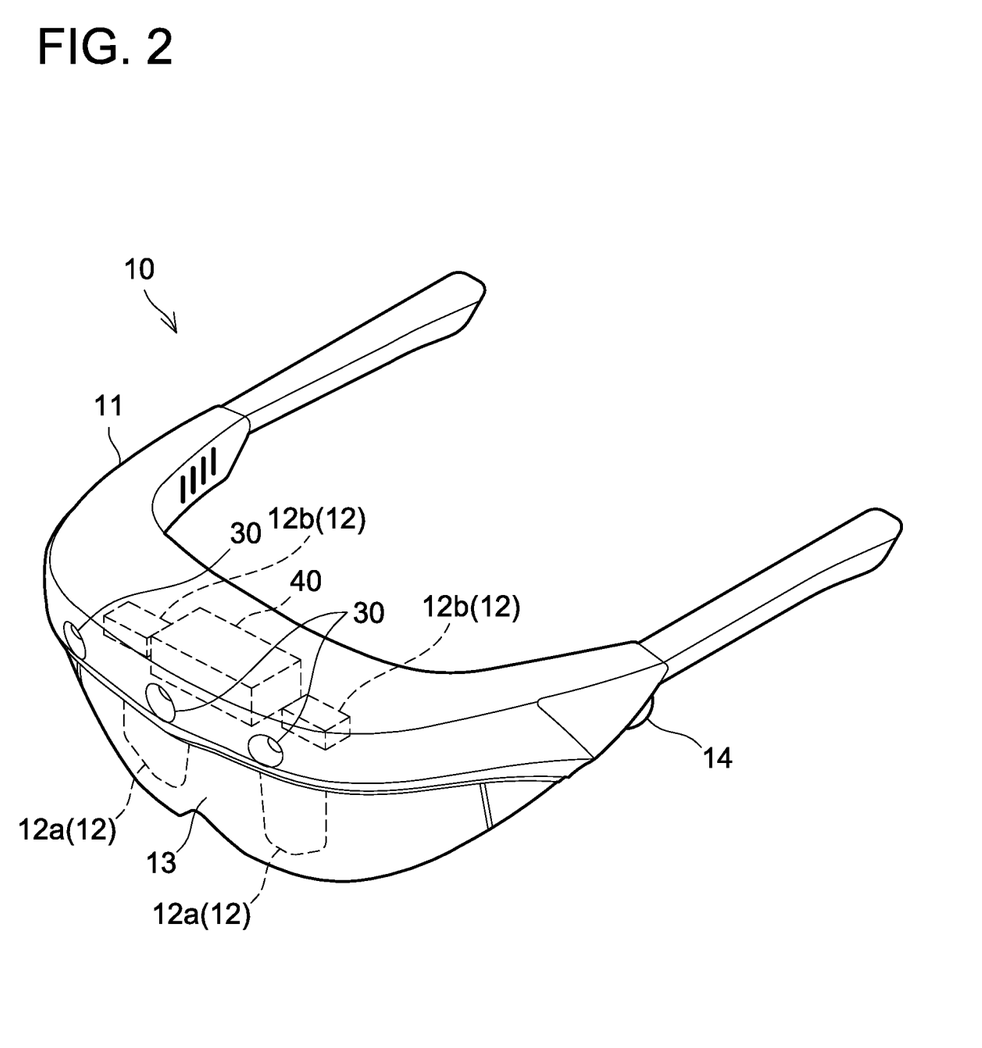
FIG. 2 schematically illustrates a terminal device 10.
Figure 3:
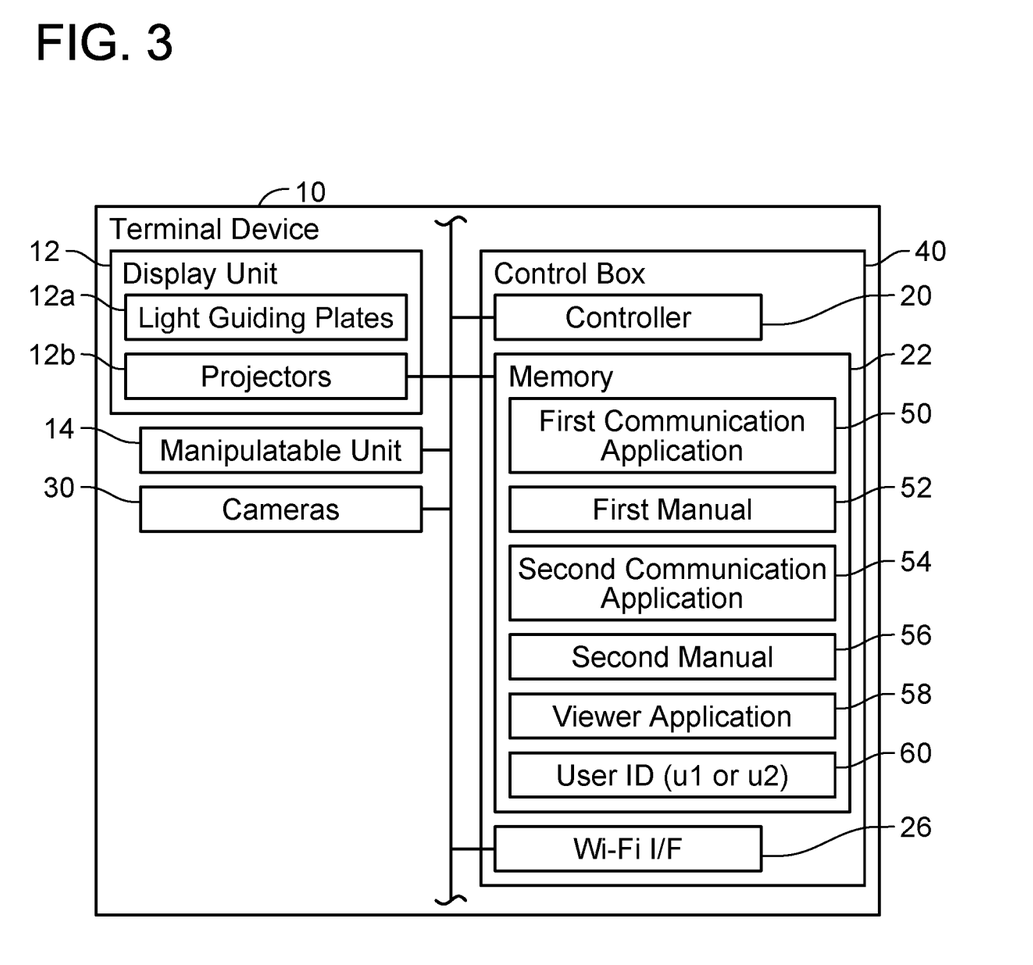
FIG. 3 illustrates a block diagram of the terminal device 10.

(Configuration of Terminal Device 10; FIGS. 1 to 3)

The terminal device 10 illustrated in FIG. 1 is an image display device configured to be worn on the head of the user U in the factory 4 (i.e., a head-mounted display). The terminal device 10 is configured to execute a plurality of functions such as display of information, communication, etc. Here, the user U wearing the terminal device 10 is, for example, a device-user who uses the devices D1, D2, a maintenance staff who maintains the devices D1, D2, or the like. Depending on whether the user U is the device user or the maintenance staff, different functions among the plurality of functions the terminal device 10 is capable of executing are executed. When the user U is the device-user, a display function that causes a display unit 12 to display (for browsing) a manual to use the device D1, D2 is mainly executed, among the plurality of functions the terminal device 10 is capable of executing. On the other hand, when the user U is the maintenance staff, a communication function to execute communication (e.g., audio communication using a microphone and a speaker, which are not illustrated) with the outside (e.g., the first call center 200, the second call center 300, etc.) for maintenance of the devices D1, D2 is mainly executed, among the plurality of functions the terminal device 10 is capable of executing.

As illustrated in FIG. 2, the terminal device 10 comprises a frame 11, the display unit 12, a cover 13, a manipulatable unit 14, cameras 30, and a control box 40.

The frame 11 is a member in the form of an approximate eyeglasses frame. The user U can put on the terminal device 10 on the head by putting the frame 11 on from the face side as if putting on eyeglasses.

The display unit 12 is a transparent display and is configured to be positioned in a range facing the eyes of the user U when the user U wears the frame 11 on the head. The display 12 comprises two, left and right light guiding plates 12a, and left and right projectors 12b corresponding to the light guiding plates 12a.

The light guiding plates 12a are transparent substrates. The light guiding plates 12a are constituted of glass, transparent resin, or the like, for example. In the present embodiment, the two light guiding plates 12a are positioned in ranges facing both eyes of the user U, respectively, when the user U wears the terminal device 10 on the head. The user U can see the surroundings through the light guiding plates 12a. Further, half-mirror members (not illustrated) that reflect image-forming light projected from the projectors 12b toward the eyes are disposed in the light guiding plates 12a.

The projectors 12b are members that project the image-forming light to the respective light guiding plates 12a. The two projectors 12b are positioned above the left and right light guiding plates 12a, respectively, in the frame 11. In the present embodiment, the projectors 12b project a predetermined image to the light guiding plates 12a according to instructions from a controller 20 (see FIG. 3). Thus, the user U can see an object and/or space in the real world together with the predetermined image as if the predetermined image is superimposed at predetermined position(s) of the object and/or space in the real world that the user U can see through the light guiding plates 12a. Hereinafter in the present specification, when descriptions are made on the controller 20 instructing the projectors 12b to project an image to display the desired image on the light guiding plates 12a, descriptions on operations of the projectors 12b and the light guiding plates 12a are omitted and it may be described simply as "the controller 20 causes the display unit 12 to display an image", for example.

The cover 13 is a transparent protective member positioned forward of the two light guiding plates 12a. That is, the user U wearing the terminal device 10 on the head can see the surroundings through the light guiding plates 12a and the cover 13.

The manipulatable unit 14 includes a button, a dial, etc. The user U can input various operations to the terminal device 10 by manipulating the manipulatable unit 14.

The cameras 30 are cameras configured to capture a range corresponding to a range of view of the user U wearing the terminal device 10 (i.e., what can be seen in the factory 4). In the example of FIG. 2, three cameras 30 are provided. In another example, the number of the cameras 30 is not limited to three, and may be one or two.

The control box 40 is a controller disposed in a part of the frame 11. The control box 40 houses elements that administer a control system of the terminal device 10. Specifically, as illustrated in FIG. 3, the control box 40 houses the controller 20, a memory 22, and a Wi-Fi interface 26. Hereinafter, an interface is abbreviated as "I/F".

The controller 20 executes various processes according to programs stored in the memory 22. Further, as illustrated in FIG. 3, the controller 20 is electrically connected with the display unit 12 (specifically, the projectors 12b), the manipulatable unit 14, the cameras 30, and the Wi-Fi I/F 26, and is capable of controlling operations of these elements.

The memory 22 is configured of a ROM, a RAM, a hard disk, etc. In the present embodiment, the memory 22 stores various programs including a first communication application 50, a second communication application 54, a viewer application 58, etc. The memory 22 further stores various data files to be browsed such as a first manual 52, a second manual 56, etc. The memory 22 further stores a user ID 60 ("u1" or "u2") indicative of the attribute of the user U using the terminal device 10 (i.e., the device-user, the maintenance staff, or the like). In addition to the above, the memory 22 also stores a unique terminal 11) assigned to the terminal device 10 itself. Further, the memory 22 also includes a region in which various information generated through processes executed by the controller 20 are stored.

The first communication application 50 is a communication application program provided by the company C1 (i.e., the manufacturer of the device D1). When the user U (mainly, the maintenance staff) uses the terminal device 10 to communicate (in audio communication) with the first call center 200, which is a call center of the company C1, the communication is executed after the first communication application 50 has been activated.

The first manual 52 is an instruction manual for the device D1. The first manual 52 is provided by the company C1. When the user U (mainly, the device-user) uses the terminal device 10 to browse the first manual 52, contents of the first manual 52 are displayed on the display unit 12 after the viewer application 58 has been activated.

The first communication application 50 and the first manual 52 are downloaded from a server (not illustrated) the company C1 installed on the Internet 6 and are stored in the memory 22. In another example, the first communication application 50 and the first manual 52 may be stored in the memory 22 by reading a storage medium (e.g., a CD-ROM, etc.) distributed by the company C1.

The second communication application 54 is a communication application program provided by the company C2 (i.e., the manufacturer of the device D2). When the user U (mainly, the maintenance staff) uses the terminal device 10 to communicate (in audio communication) with the second call center 300, which is a call center of the company C2, the communication is executed after the second communication application 54 has been activated.

The second manual 56 is an instruction manual for the device D2. The second manual 56 is provided by the company C2. When the user U (mainly, the device-user) uses the terminal device 10 to browse the second manual 56, contents of the second manual 56 are displayed on the display unit 12 after the viewer application 58 has been activated.

The second communication application 54 and the second manual 56 are downloaded from a server (not illustrated) the company C2 installed on the Internet 6 and are stored in the memory 22. In another example, the second communication application 54 and the second manual 56 may be stored in the memory 22 by reading a storage medium (e.g., a CD-ROM, etc.) distributed by the company C2.

The viewer application 58 is an application program to cause the display unit 12 to display a data file (for browsing). The viewer application 58 of the present embodiment is a known information display application program. As described, when the user U (mainly, the device-user) uses the terminal device 10 to browse the first manual 52 and the second manual 56, the contents are displayed on the display unit 12 after the viewer application 58 has been activated.

In the present embodiment, information indicative of "u1" or "u2" is stored as the user ID 60. Specifically, the user ID "u1" indicates that the user U using the terminal device 10 is "the maintenance staff", and the user ID "u2" indicates that the user U using the terminal device 10 is "the device-user".

The Wi-Fi I/F 26 is an I/F to execute Wi-Fi communication with the external server 100, the first call center 200, and the second call center 300 via the Internet 6.

Figure 4:
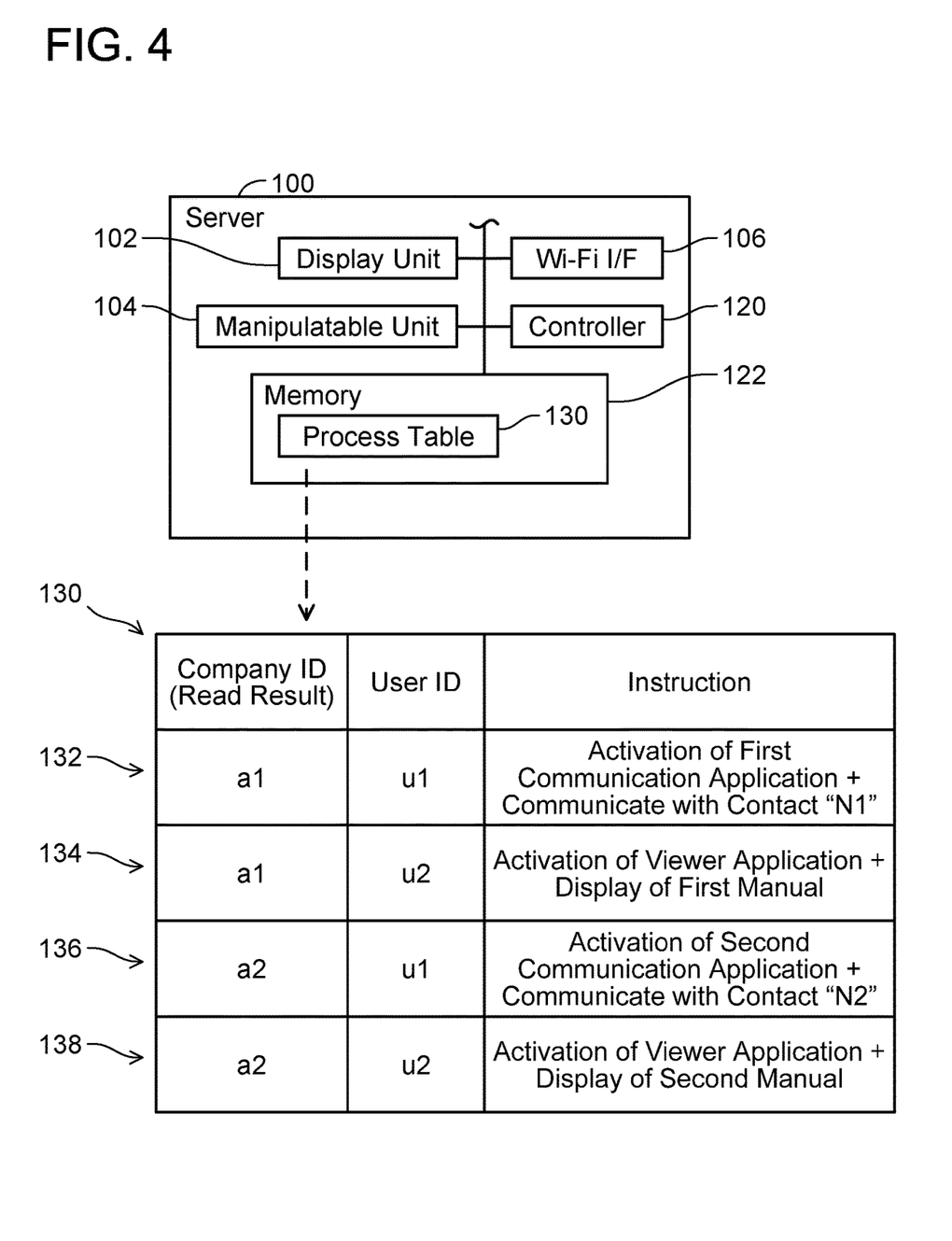
FIG. 4 illustrates a block diagram of a server 100.

(Configuration of Server 100; FIG. 1, FIG. 4)

The server 100 illustrated in FIG. 1 is a server installed by an administrator of the management system 2. As illustrated in FIG. 4, the server 100 comprises a display unit 102, a manipulatable unit 104, a Wi-Fi I/F 106, a controller 120, and a memory 122.

The display unit 102 is a display for displaying various information. The manipulatable unit 104 comprises a keyboard and a mouse. A user of the server 100 (e.g., the system administrator, etc.) can input various instructions to the server 100 by manipulating the manipulatable unit 104.

The Wi-Fi I/F 106 is an I/F to execute Wi-Fi communication with the terminal device 10 via the Internet 6.

The controller 120 executes various processes according to programs stored in the memory 122. Further, as illustrated in FIG. 4, the controller 120 is electrically connected with the display unit 102, the manipulatable unit 104, the Wi-Fi I/F 106, and the memory 122, and is capable of controlling operations of these elements.

The memory 122 is configured of a ROM, a RAM, a hard disk, etc. The memory 122 stores various programs. In addition to the programs, the memory 122 further stores a process table 130. The process table 130 is stored in advance in the memory 122. The process table 130 describes contents of operations that the server 100 causes the terminal device 10 to execute according to contents of requests received from the terminal device 10 when the controller 120 executes processes according to the programs. That is, the operations described in the process table 130 are executed when the controller 120 executes processes according to the programs.

As illustrated in FIG. 4, the process table 130 includes four pieces of combination information 132, 134, 136, 138. Each of the combination information 132 to 138 includes a company ID (such as "a1") and a user ID (such as "u1") included in a request received from the terminal device 10 and an instruction content (such as "activation of first application+communication with contact N1") that is to be included in a response signal that the server 100 sends to the terminal device 10 according to the combination of the company ID and the user ID.

Specifically, the combination information 132 indicates, when a request from the terminal device 10 includes the company ID "a1" and the user ID "u1", that a response signal including an instruction for activation of the first communication application 50 and an instruction for communication with the contact "N1" (i.e., the contact of the first call center 200) is to be sent to the terminal device 10.

The combination information 134 indicates, when a request from the terminal device 10 includes the company ID "a1" and the user ID "u2", that a response signal including an instruction for activation of the viewer application 58 and an instruction for display of the first manual 52 is to be sent to the terminal device 10. The combination information 136 indicates, when a request from the terminal device 10 includes the company ID "a2" and the user ID "u1", that a response signal including an instruction for activation of the second communication application 54 and an instruction for communication with the contact "N2" (i.e., the contact of the second call center 300) is to be sent to the terminal device 10. The combination information 138 indicates, when a request from the terminal device 10 includes the company ID "a2" and the user ID "u2", that a response signal including the instruction for activation of the viewer application 58 and an instruction for display of the second manual 56 is to be sent to the terminal device 10.

As will be described in detail later, when receiving a request, the controller 120 of the server 100 refers to the process table 130 to determine instructions to be included in a response signal (see S72 in FIG. 6). However, when a combination of a company ID and a user ID included in a request does not exist in the process table 130 (e.g., when a read result of an information code at the terminal device 10 is not the company ID "a1" or "a2", etc.), the controller 120 of the server 100 does not have a response signal include an instruction for activation, etc. (i.e., does not instruct execution of a function).

(Configurations of First Call Center 200, Second Call Center 300; FIG. 1)

The first call center 200 is a call center established by the company C1. The contact of the first call center 200 is "N1". The terminal device 10 can communicate (e.g., in audio communication) with the first call center 200 by designating the contact "N1" after having activated the first communication application 50 provided by the company C1.

Similarly, the second call center 300 is a call center established by the company C2. The contact of the second call center 300 is "N2". The terminal device 10 can communicate (e.g., in audio communication) with the second call center 300 by designating the contact "N2" after having activated the second communication application 54 provided by the company C2.

(Processes Executed by Terminal Device 10 and Server 100 of Management System 2)

Figure 5:
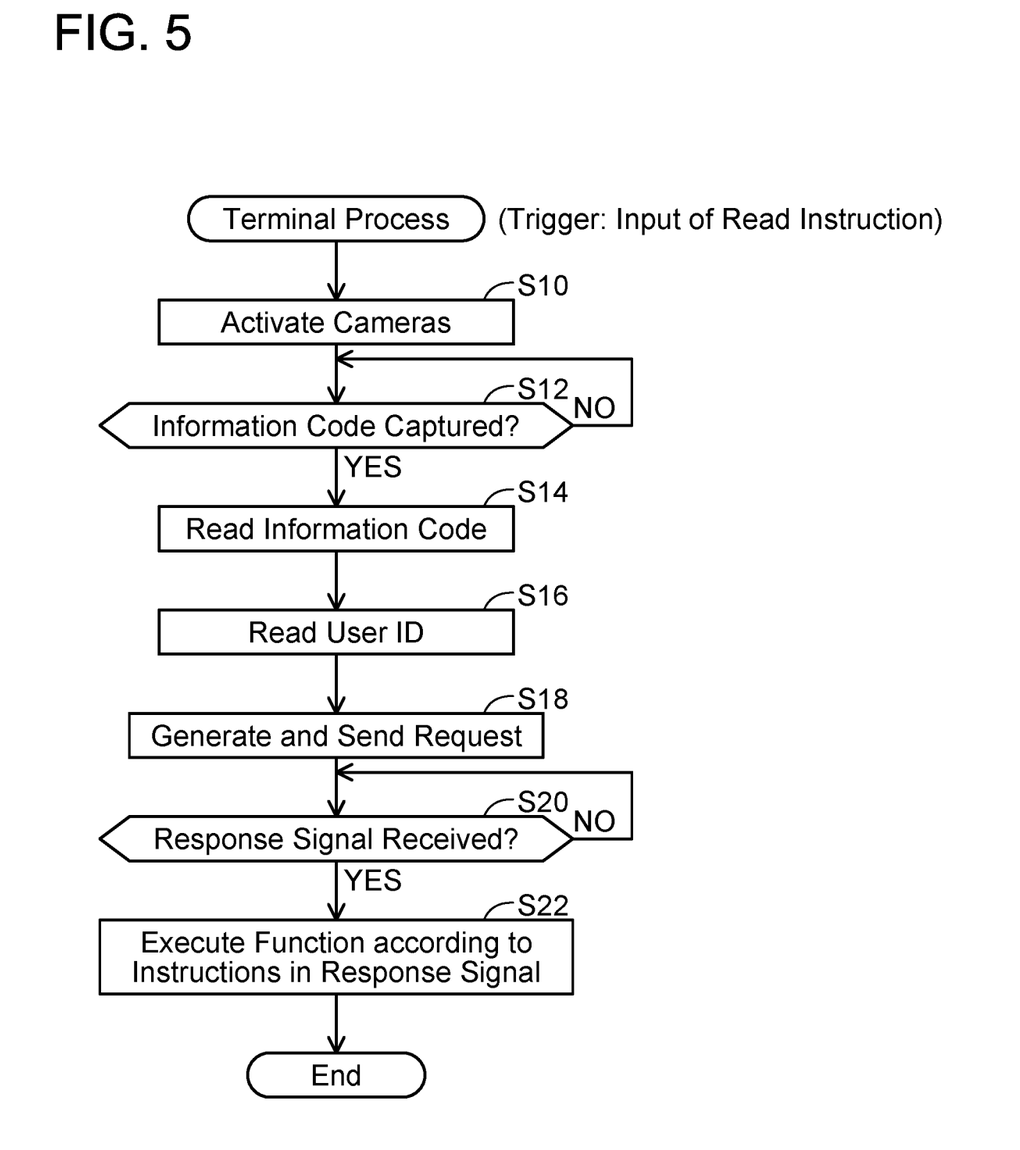
FIG. 5 illustrates a flowchart of a terminal process executed by a controller 20 of the terminal device 10.
Figure 6:
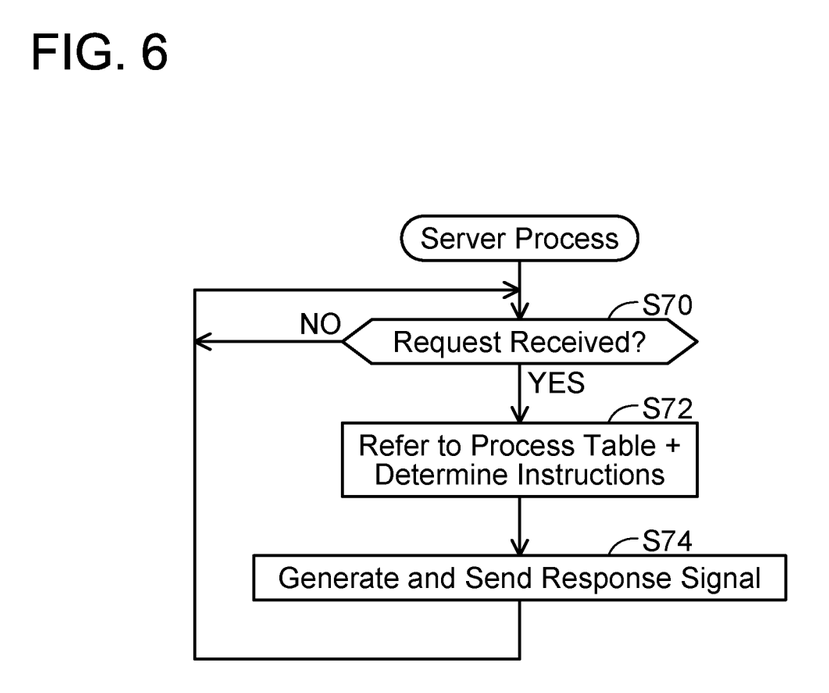
FIG. 6 illustrates a flowchart of a terminal process executed by a controller 120 of the server 100.

Now, referring to FIGS. 5 and 6, a terminal process (FIG. 5) executed by the controller 20 of the terminal device 10 and a server process (FIG. 6) executed by the controller 120 of the server 100 in the management system 2 of the present embodiment are described. Appropriate management for the devices D1, D2 using the management system 2 is implemented by the controller 20 of the terminal device 10 executing the terminal process and the controller 120 of the server 100 executing the server process.

(Terminal Process Executed by Controller 20 of Terminal Device 10; FIG. 5)

Referring to FIG. 5, the terminal process executed by the controller 20 of the terminal device 10 is described. The user U (the maintenance staff or the device-user) wearing the terminal device 10 in the factory 4 inputs a predetermined read instruction to the terminal device 10, for example, by manipulating the manipulatable unit 14. In this case, the controller 20 of the terminal 10 starts the process of FIG. 5.

In S10, the controller 20 activates the cameras 30 to start capturing what is within the range of view. At least one captured image by the cameras 30 is supplied to the controller 20 in real time (i.e., continuously).

In subsequent S12, the controller 20 monitors whether an information code (e.g., the information codes Co1, Co2 in FIG. 1, etc.) is included in the at least one captured image acquired from the cameras 30. Specifically, the controller 20 monitors whether an image that represents a characteristic indicative of an information code (such as a specific finder pattern) is included in the at least one captured image continuously acquired from the cameras 30. When an image representing a characteristic indicative of an information code is detected in the at least one captured image, the controller 20 determines YES in S12 and proceeds to S14.

In S14, the controller 20 reads the information code included in the at least one captured image. Specifically, the controller 20 executes a known decoding process to the information code represented by the image of the information code included in the at least one captured image (which may be termed the specific information code, hereinafter). As a result, the controller 20 can acquire information recorded in the specific information code as a read result. For example, when the user U wearing the terminal device 10 in the factory 4 sees the information code Co1 attached on the device D1, the information code Co1 of the device D1 enters within the capturing range of the cameras 30. In this case, an image of the information code Co1 is included in the at least one captured image. In this case, the read result in S14 indicates the company ID "a1" of the company C1.

In subsequent S16, the controller 20 refers to the memory 22 to read the value of the user ID 60 ("u1" or "u2") stored in the memory 22.

In subsequent S18, the controller 20 generates a request including the read result acquired in S14 and the user ID read in S16, and sends it to the server 100.

In subsequent S20, the controller 20 monitors whether a response signal is received from the server 100. When receiving the request, the server 100 refers to the process table 130 (FIG. 4), generates a response signal including instructions to be followed by the terminal device 10, and sends the response signal to the terminal device 10 (see FIG. 6 to be described later). In this case, the controller 20 receives the response signal from the server 100. When receiving the response signal from the server 100, the controller 20 determines YES in S20 and proceeds to S22.

In S22, the controller 20 executes a function according to the instructions included in the response signal from the server 100. The function executed in S22 varies depending on the instructions included in the response signal. Hereinafter, five function patterns executed in the present embodiment will be described.

(First Pattern)

When the received response signal includes the instruction for activation of the first communication application 50 and the instruction for communication with the contact "N1" (i.e., the contact of the first call center 200) (i.e., when the request sent in S18 matches the combination information 132 in FIG. 4), the controller 20 firstly activates the first communication application 50 according to the activation instruction in the response signal in S22. Then, after having activated the first communication application 50, the controller 20 communicates (in audio communication) with the first call center 200 by starting the communication with the contact "N1" as its communication counterpart. For this, the user U does not need to input operations such as an application activation operation. Thereafter, when the user U performs a communication terminating operation, the communication between the terminal device 10 and the first call center 200 terminates. In this case, the controller 20 terminates the terminal process of FIG. 5.

(Second Pattern)

When the received response signal includes the instruction for activation of the viewer application 58 and the instruction for display of the first manual 52 (i.e., when the request sent in S18 matches the combination information 134 in FIG. 4), the controller 20 firstly activates the viewer application 58 according to the activation instruction in the response signal in S22. Then, the controller 20 opens the first manual 52 according to the activated viewer application 58 and causes the display unit 12 to display data in the first manual 52. The user U does not need to input an operation such as an application activation operation. The controller 20 may cause the display unit 12 to display a page of the first manual 52 that was displayed at the end of the previous display. The user U can browse the data in the first manual 52 displayed on the display unit 12. Then, when the user U performs a display terminating operation, the display of the first manual 52 terminates. In this case, the controller 20 terminates the terminal process of FIG. 5.

(Third Pattern)

When the received response signal includes the instruction for activation of the second communication application 54 and the instruction for communication with the contact "N2" (i.e., the contact of the second call center 300) (i.e., when the request sent in S18 matches the combination information 136 in FIG. 4), the controller 20 firstly activates the second communication application 56 according to the activation instruction in the response signal in S22. Then, after having activated the second communication application 56, the controller 20 communicates (in audio communication) with the second call center 300 by starting the communication with the contact "N2" as the communication counterpart. For this, the user U does not need to input an operation such as an application activation operation. Thereafter, when the user U performs the communication terminating operation, the communication between the terminal device 10 and the second call center 300 terminates. In this case, the controller 20 terminates the terminal process of FIG. 5.

(Fourth Pattern)

When the received response signal includes the instruction for activation of the viewer application 58 and the instruction for display of the second manual 56 (i.e., when the request sent in S18 matches the combination information 138 in FIG. 4), the controller 20 firstly activates the viewer application 58 according to the activation instruction in the response signal in S22. Then, the controller 20 opens the second manual 56 according to the activated viewer application 58 and causes the display unit 12 to display data in the second manual 56. The user U does not need to input an operation such as an application activation operation. The controller 20 may cause the display unit 12 to display a page of the second manual 56 that was displayed at the end of the previous display. The user U can browse the data in the second manual 56 displayed on the display unit 12. Then, when the user U performs the display terminating operation, the display of the second manual 56 terminates. In this case, the controller 20 terminates the terminal process of FIG. 5.

(Fifth Pattern)

When the received response signal does not include an activation instruction or the like (i.e., when the request sent in S18 matches none of the combination information 132 to 138 in FIG. 4), the controller 20 does not execute any function in S22. In this case, the controller 20 just terminates the terminal process of FIG. 5.

(Server Process Executed by Controller 120 of Server 100; FIG. 6)

Referring to FIG. 6, the server process executed by the controller 120 of the server 100 is described. While the server 100 is in operation, the controller 120 continuously executes the server process of FIG. 6. In S70, the controller 120 monitors whether a request is received from the terminal device 10 (S18 in FIG. 5). When receiving a request from the terminal device 10 (S18 in FIG. 5), the controller 120 determines YES in S70 and proceeds to S72.

In S72, the controller 120 refers to the process table 130 (FIG. 4) to determine which instructions are to be included in a response signal to be sent to the terminal device 10. Specifically, in S72, the controller 120 firstly specifies which of the combination information 132 to 138 in the process table 130 includes the combination of the read result of the information code and the user ID in the request. Then, according to the result, the controller 120 determines that the corresponding instructions are to be included in the response signal. Hereinafter, specific patterns in the present embodiment will be described.

When the read result of the information code is the company ID "a1" indicative of the company C1 and the user ID is "u1" indicative of the maintenance staff in the request, the combination information 132 is specified. In this case, in S72, the controller 120 determines that the instructions included in the combination information 132, namely the instruction for activation of the first communication application 50 and the instruction for communication with the contact "N1" (i.e., the contact of the first call center 200), are to be included in the response signal.

When the read result of the information code is the company ID "a1" indicative of the company C1 and the user ID is "u2" indicative of the device user in the request, the combination information 134 is specified. In this case, in S72, the controller 120 determines that the instructions included in the combination information 134, namely the instruction for activation of the viewer application 58 and the instruction for display of the first manual 52, are to be included in the response signal.

When the read result of the information code is the company ID "a2" indicative of the company C2 and the user ID is "u1" indicative of the maintenance staff in the request, the combination information 136 is specified. In this case, in S72, the controller 120 determines that the instructions included in the combination information 136, namely the instruction for activation of the second communication application 54 and the instruction for communication with the contact "N2" (i.e., the contact of the second call center 300), are to be included in the response signal.

When the read result of the information code is the company ID "a2" indicative of the company C2 and the user ID is "u2" indicative of the user in the request, the combination information 138 is specified. In this case, in S72, the controller 120 determines that the instructions included in the combination information 138, namely the instruction for activation of the viewer application 58 and the instruction for display of the second manual 56, are to be included in the response signal.

When the read result of the information code is a value different from both of the company IDs "a1" and "a2" in the request (e.g., when an information code different from the information codes Co1 and Co2 is read at the terminal device 10), none of the combination information 132 to 138 is specified. In this case, in S72, the controller 120 determines that no instructions, such as an activation instruction, are to be included in the response signal.

In S74, the controller 120 generates a response signal including the instructions determined in S72 and sends the response signal to the terminal device 10, which is the sender of the request. When S74 is completed, the controller 120 returns to the monitoring of S70.

The configuration and operation of the management system 2 according to the present embodiment have been described. In the present embodiment, the factory 4, which is a single site, includes the plurality of devices D1, D2, which are management targets. In this case, the devices are appropriately used and maintained by causing the terminal device 10 to execute, for each of the devices D1, D2, a plurality of functions including, for example, the function of executing communication with the installer (the first call center 200 of the company C1 or the second call center 300 of the company C2), the function of displaying the manual of the device, etc., according to the attribute of the user (the device user or the maintenance staff). With conventional configurations, the user of the terminal device (such as the device user, the maintenance staff) has to perform necessary operations on the terminal device to execute the functions for each device located in the site under such a situation. Meanwhile, depending on the attribute of the user of the terminal device (e.g., user type such as the device user, the maintenance staff, etc.), the terminal device may be desired to execute different functions to use or maintain the devices.

In this regard, according to the present embodiment, the terminal device 10 can switch between the function of communicating with the first call center 200 (S28 in FIG. 5), the function of displaying the first manual 52 (S34), the function of communicating with the second call center 300 (S48), and the function of displaying the second manual 56 (S54) depending on whether the read result based on the image representing the specific information code included in the at least one captured image acquired from the cameras 30 is indicative of the company ID "a1" (the company C1) or the company ID "a2" (the company C2) and whether the user ID 60 stored in the memory 22 is indicative of "u1" (the maintenance staff) or "u2" (the device user). Further, the terminal device 10 can execute different functions depending on the user ID (i.e., user U's attribute) stored in the memory 22 even when specific information ("a1" or "a2") is read by a specific information code being read. Thus, when the devices D1, D2, which are management targets, are provided with the information code Co1 in which the company ID "a1" is recorded and the information code Co2 in which the company ID "a2" is recorded such that these codes can be captured from the outside, the terminal device 10 can execute an appropriate function among the function of communicating with the first call center 200, the function of displaying the first manual 52, the function of communicating with the second call center 300, and the function of displaying the second manual 56 (see the process table 130 in FIG. 4), in response to the cameras 30 capturing a specific information code, depending on the attribute of the user of the terminal device 10 (i.e., the device user or the maintenance staff) and the information (the company ID "a1" or "a2") recorded in the specific information code. The user U of the terminal device 10 does not have to input operations to execute the respective functions separately for each management target. Thus, according to the above configuration, an operation-related burden on the user U of the terminal device 10 can be appropriately reduced.

Further, in the present embodiment, when communication with the first call center 200 is to be executed, the terminal device 10 starts communication with the first call center 200 after having activated the first communication application 50 according to the activation instruction included in the response signal. Similarly, when communication with the second call center 300 (S48 in FIG. 5) is to be executed, the terminal device 10 starts communication with the second call center 300 after having activated the second communication application 54 according to the activation instruction included in the response signal. That is, even when a specific information code (the information code Co1 or Co2) is read, the terminal device 10 can appropriately switch between the function accompanied by the activation of the communication application (the first communication application 50 or the second communication application 54) and the function that is not accompanied by the activation of the communication application (i.e., display of the first manual 52 or the second manual 56) depending on the user's attribute (the maintenance staff of the device user), and execute it.

Further, in the present embodiment, when the read result of an information code is neither "a1" or "a2", the terminal device 10 does not cause the display unit 12 to display the manual (the first manual 52 or the second manual 56) nor communicate with the call center (the first call center 200 or the second call center 300) (does not execute any function). This prevents the functions of the terminal device 10 from being executed erroneously.

Further, the terminal device 10 in the present embodiment is configured as a head-mounted display wearable on the head of the user U. Since the user U does not have to hold the terminal device 10 with hands, the user U can work with both hands. Convenience for the user U is improved as compared to a case in which the terminal device 10 has to be held. Although the terminal device 10 in the present embodiment is configured as a head-mounted display, the user U may find it more difficult to input instructions to such a terminal device than inputting instructions to a hand-held terminal device 10 especially when the user U is not used to a user interface specific to a head-mounted display. In this regard, the user U can cause the terminal device 10 of the present embodiment to execute a suitable function simply by capturing an information code with the cameras 30, without inputting a function execution instruction himself/herself. The user U can concentrate on work with both hands.

Here, correspondence relationships between the embodiment and the claims are described. The management system 2 is an example of the "function execution device". The terminal device 10 is an example of the "terminal component". The cameras 30 are an example of the "image capturing unit". The server 100 is an example of the "management component". The controller 20 of the terminal device 10 is examples of the "function execution device", the "image acquisition device", and the "reader device". The memory 22 of the terminal device 10 is an example of the "storage device". Communicating with the first call center 200 is an example of the "first function", causing the display unit 12 to display the first manual 52 is an example of the "second function", communicating with the second call center 300 is an example of the "third function", and causing the display unit 12 to display the second manual 56 is an example of the "fourth manual". The maintenance staff is an example of the "first-type user", and the device user is an example of the "second-type user". The user ID) "a1" is an example of the "first user information", and the user ID "a2" is an example of the "second user information". The company ID "u1" is an example of the "first code information", the company ID "u2" is an example of the "second code information", and a read result other than "a1" and "a2" is an example of the "third code information". The first communication application 50 is an example of the "first application program", and the second communication application 54 is an example of the "second application program". The first call center 200 is an example of the "first communication counterpart", and the second call center 300 is an example of the "second communication counterpart". The first manual 52 is an example of the "first information to be browsed", and the second manual 56 is an example of the "second information to be browsed". The case in which the request matches the combination information 132 is an example of the "first case", the case in which the request matches the combination information 134 is an example of the "second case", the case in which the request matches the combination information 136 is an example of the "third case", and the case in which the request matches the combination information 138 is an example of the "fourth case".

While specific examples of the present disclosure have been described above in detail, these examples are merely illustrative and place no limitation on the scope of the patent claims. The technology described in the patent claims also encompasses various changes and modifications to the specific examples described above. For example, variants described below may be employed.

(Variant 1) In the embodiment above, the cameras 30 are mounted on the frame 11 and are a part of the terminal device 10. Unlike this configuration, the cameras may be a separate component from the terminal device 10. In this case, the captured image captured by the cameras may be sent to the controller 20 via a communication network when needed.

(Variant 2) In the embodiment above, the terminal device 10 is configured as a head-mounted display wearable on the head of the user U. Unlike this configuration, the terminal device 10 may be a portable terminal device the user U can carry, such as a laptop PC, a tablet terminal, or a smartphone, or a terminal device of any type such as a stationary terminal device, for example, a desktop PC.

(Variant 3) In the embodiment above, the controller 20 switches between the functions of communication with the first call center 200 (S28 in FIG. 5), display of the first manual 52 (S34), communication with the second call center 300 (S48), and display of the second manual 56 (S54) depending on whether the read result based on the image representing the information code included in the captured image acquired from the cameras 30 indicates the company ID "a1" (the company C1) or "a2" (the company C2) and whether the user ID 60 stored in the memory 22 indicates "u1" (the maintenance staff) or "u2" (the user). However, the functions the controller 20 is capable of executing are not limited to the functions above, and may include any functions the terminal device 10 is capable of executing. In this case, these functions are examples of the "first to fourth functions". Further, the attribute of the user U indicated by the user ID 60 stored in the memory 22 is not limited to "maintenance staff" and "device user" and may be any other attribute. The user ID 60 in this case is also examples of the "first user information" and the "second user information".

(Variant 4) Especially in place of the communication with the first call center 200 and the communication with the second call center 300, the terminal device 10 may execute any other functions (such as functions of causing the devices D1, D2 to execute some sort of operation). The functions executed in this variant are also examples of the "first function" and the "third function".

(Variant 5) In the embodiment above, the terminal device 10 executes mainly audio communication with the first call center 200 and the second call center 300. However, the communication between the terminal device 10 and the first call center 200 and the second call center 300 is not limited to audio communication, and may include communication of any other type such as text message communication, image (video) communication, etc.

(Variant 6) In the embodiment above, the information code Co1 in which the company ID "a1" of the company C1 is recorded is attached to the device D1 of the company C1, and the information code Co2 in which the company ID "a2" of the company C2 is recorded is attached to the device D2 of the company C2. Unlike this configuration, a plurality of information codes in which different company IDs are recorded may be attached to a single device.

(Variant 7) In the embodiment above, the first communication application 50, the second communication application 54, and the viewer application 58 are all stored in the memory 22. Unlike this configuration, the first communication application 50, the second communication application 54, and the viewer application 58 may be stored in an external server that is capable of communicating with the terminal device 10. The controller 20 of the terminal device 10 may access the external server when the applications are to be activated and use the applications after having accessed the external server.

(Variant 8) In the embodiment above, the management system 2 comprises the terminal device 10 and the server 100. The terminal device 10 sends a request including the read result of an information code and a user ID to the server 100, receives a response signal from the server 100, and executes a function according to instructions included in the response signal. Unlike this configuration, in a variant, the terminal device 10 may determine which function is to be executed based on the read result of an information code and a user ID, and execute the function based on the determination result. In this case, the server 100 can be omitted. In another example, a function execution device configured to execute a plurality of functions, an image acquisition device configured to acquire a captured image from an image capturing unit such as the cameras 30, a reader device configured to read information recorded in an information code, and a storage device configured to store a user ID may be provided as separate devices capable of communicating with each other.

The technical elements explained in the present specification or drawings provide technical utility either independently or through various combinations. The present disclosure is not limited to the combinations described at the time the claims are filed. Further, the purpose of the examples illustrated by the present description or drawings is to satisfy multiple objectives simultaneously, and satisfying any one of those objectives gives technical utility to the present disclosure.

The invention claimed is:
1. A function execution system comprising:
a function execution device configured to execute a plurality of functions;
a storage device configured to store user information indicating a user of the function execution device;
an image acquisition device configured to acquire a captured image from an image capturing unit; and
a reader device configured to, in a case where the captured image acquired by the image acquisition device includes an image representing an information code, read information recorded in the information code, wherein the function execution device is configured to:
in a first case where the reader device reads first code information related to a first function and a second function different from the first function of the plurality of functions from the information code and the storage device stores first user information indicating a first-type user, execute the first function;
in a second case where the reader device reads the first code information from the information code and the storage device stores the second user information indicating a second-type user different from the first-type user, execute the second function.

2. The function execution system as in claim 1, wherein the function execution device comprises:
a frame wearable on a head of the user; and
a display unit arranged on the frame and configured to be positioned within a range of view of the user when the frame is worn on the head of the user.

3. The function execution system as in claim 1, wherein the storage device is configured to store one of the first user information and the second user information, and the function execution device is configured to:
in a third case where the reader device reads second code information related to a third function and a fourth function different from the third function of the plurality of the functions from the information code and the storage device stores the first user information, execute the third function; and
in a fourth case where the reader device reads the second code information from the information code and the storage device stores the second user information, execute the fourth function.

4. The function execution system as in claim 3, further comprising:
a terminal component; and
a management component capable of communicating with the terminal component,
wherein
the terminal component includes the function execution device, the image acquisition device, the reader device, and the storage device,
the terminal component is configured to cause the function execution device to:
execute the first function in response to sending a first request to the management component and then receiving a first function executing instruction from the management component in the first case;
execute the second function in response to sending a second request different from the first request to the management component and then receiving a second function executing instruction from the management component in the second case;
execute the third function in response to sending a third request to the management component and then receiving a third function executing instruction from the management component in the third case; and
execute the fourth function in response to sending a fourth request different from the third request to the management component and then receiving a fourth function executing instruction from the management component in the fourth case, and
the management component is configured to:
send the first function executing instruction to the terminal component in a case of receiving the first request from the terminal component;
send the second function executing instruction to the terminal component in a case of receiving the second request from the terminal component;
send the third function executing instruction to the terminal component in a case of receiving the third request from the terminal component; and
send the fourth function executing instruction to the terminal component in a case of receiving the fourth request from the terminal component.

5. The function execution system as in claim 3, wherein
the first function is a function executed after a first application program has been activated,
the second function is a function executed without the first application program being activated,
the third function is a function executed after a second application program has been activated, and
the fourth function is a function executed without the second application program being activated.

6. The function execution system as in claim 5, wherein
the first application program is an application program for executing communication with a first communication counterpart,
the second application program is an application program for executing communication with a second communication counterpart,
the first function is a function including execution of the communication with the first communication counterpart,
the second function is a function including display of first information to be browsed,
the third function is a function including execution of the communication with the second communication counterpart, and
the fourth function is a function including display of second information to be browsed.

7. The function execution system as in claim 3, wherein the function execution device executes none of the first function, the second function, the third function, and the fourth function in a case where the reader device reads third code information that is related to none of the first function, the second function, the third function, and the fourth function from the information code.

* * * * *